United States Patent [19]

Lefebvre

[11] 3,838,880

[45] Oct. 1, 1974

[54] FOLDING HOUSE TRAILER

[76] Inventor: Jacques Lefebvre, 2051 Marquette, Longueuil, Quebec, Canada

[22] Filed: Mar. 21, 1973

[21] Appl. No.: 343,402

[52] U.S. Cl................ 296/23 R, 296/27, 296/23 G
[51] Int. Cl............................................. B60r 15/00
[58] Field of Search......... 296/23 F, 23 B, 23 C, 36, 296/23 H, 23 G, 23 R, 27; 280/37, 36 R

[56] References Cited
UNITED STATES PATENTS

| | | | |
|---|---|---|---|
| 2,902,312 | 9/1959 | Ferrera | 296/23 C |
| 3,168,343 | 2/1965 | Marcel | 296/27 |
| 3,352,596 | 11/1967 | Escoto | 296/27 |
| 3,394,961 | 7/1968 | Matte | 296/27 |
| 3,556,581 | 1/1971 | Silva | 296/23 G |

Primary Examiner—Robert J. Spar
Assistant Examiner—G. L. Auton
Attorney, Agent, or Firm—Bacon & Thomas

[57] ABSTRACT

A folding house trailer is provided with box-like end sections pivoted on the floor and foldable to nest within each other, the space between them when they are in raised position being enclosed by foldable side walls and a foldable roof. The foldable side walls have provision for being shifted laterally outwardly so that in raised position, they are flush with the outer end sections while in folded position they are nested within the inner end section. The arrangement provides a house trailer which is compact in folded position and very spacious in raised position and which can easily be collapsed or erected.

8 Claims, 9 Drawing Figures

PATENTED OCT 1 1974 3,838,880
SHEET 1 OF 3
FIG. 1
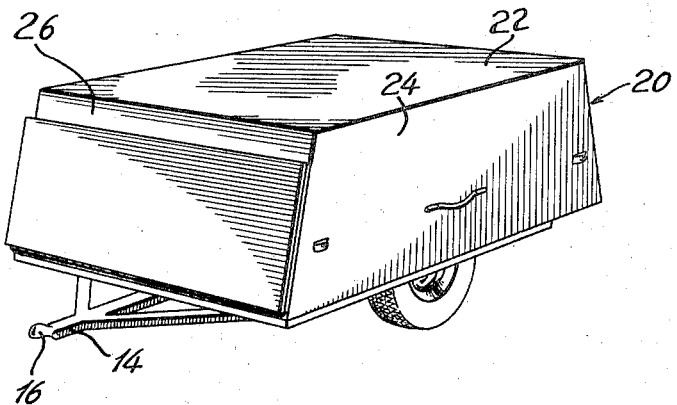
FIG. 8
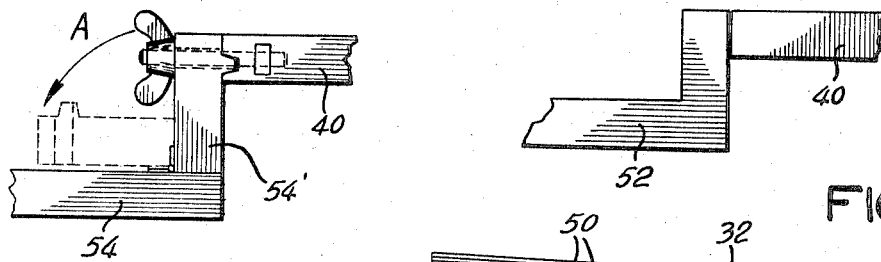
FIG. 9
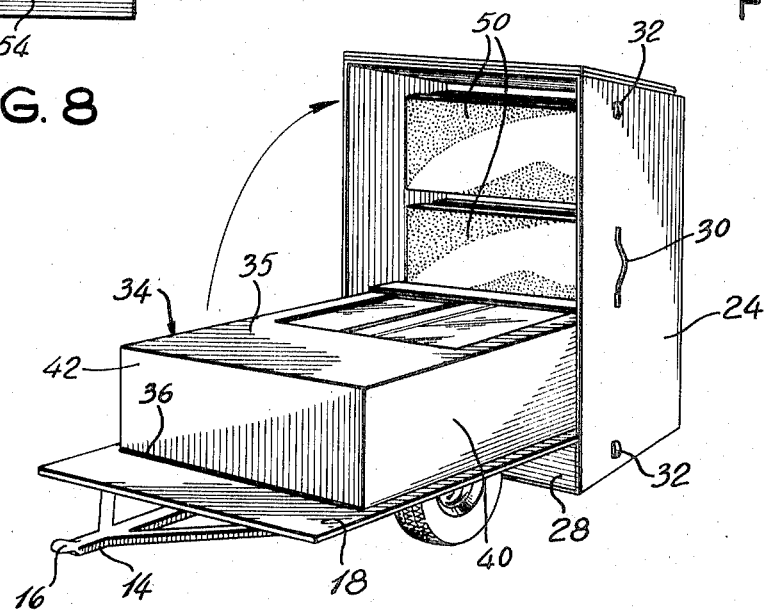
FIG. 2

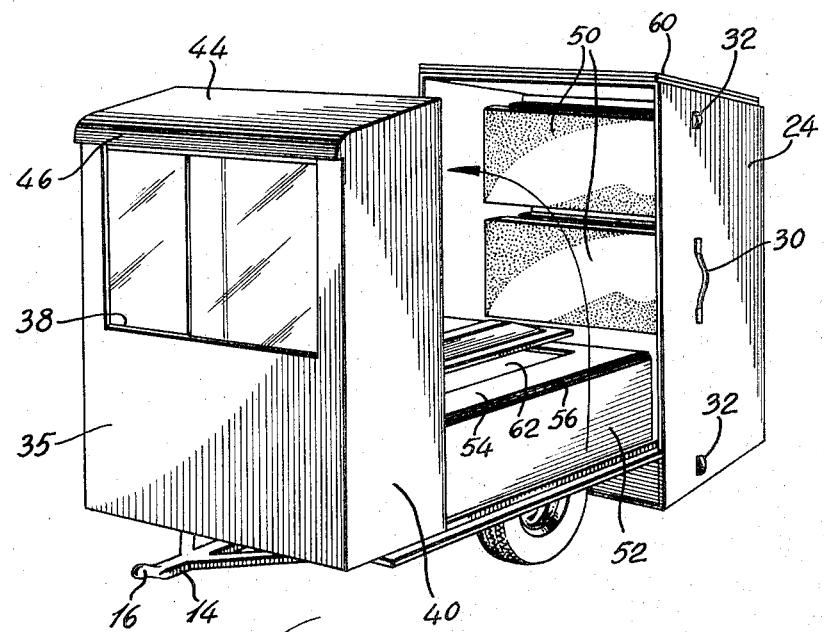
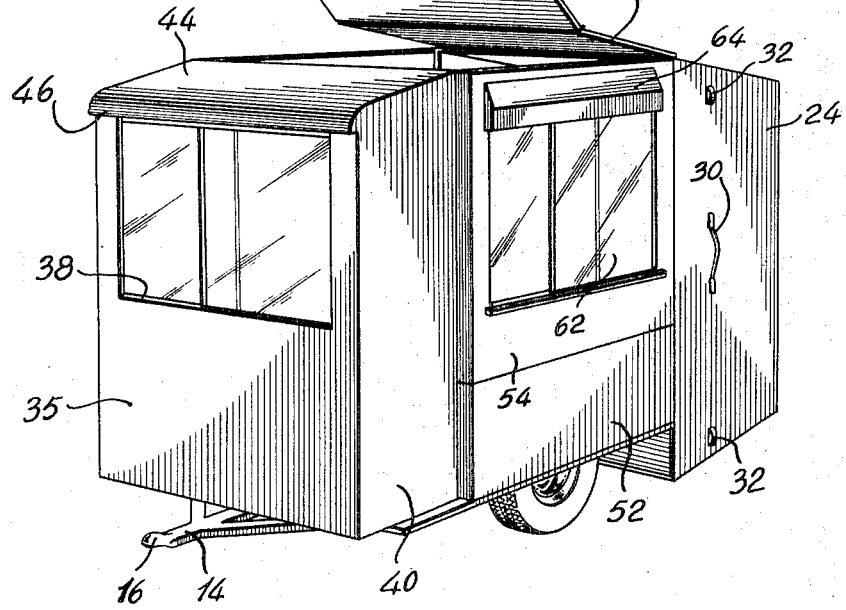

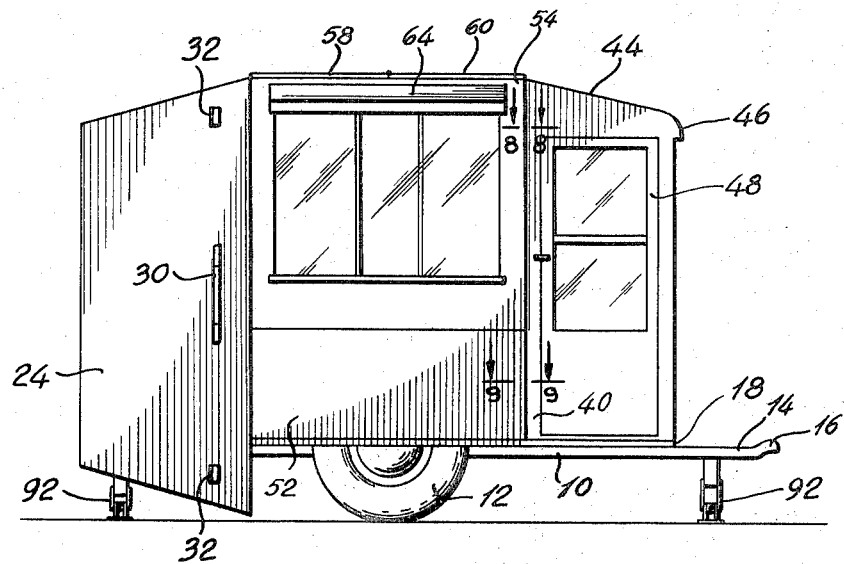
FIG. 5
FIG. 6
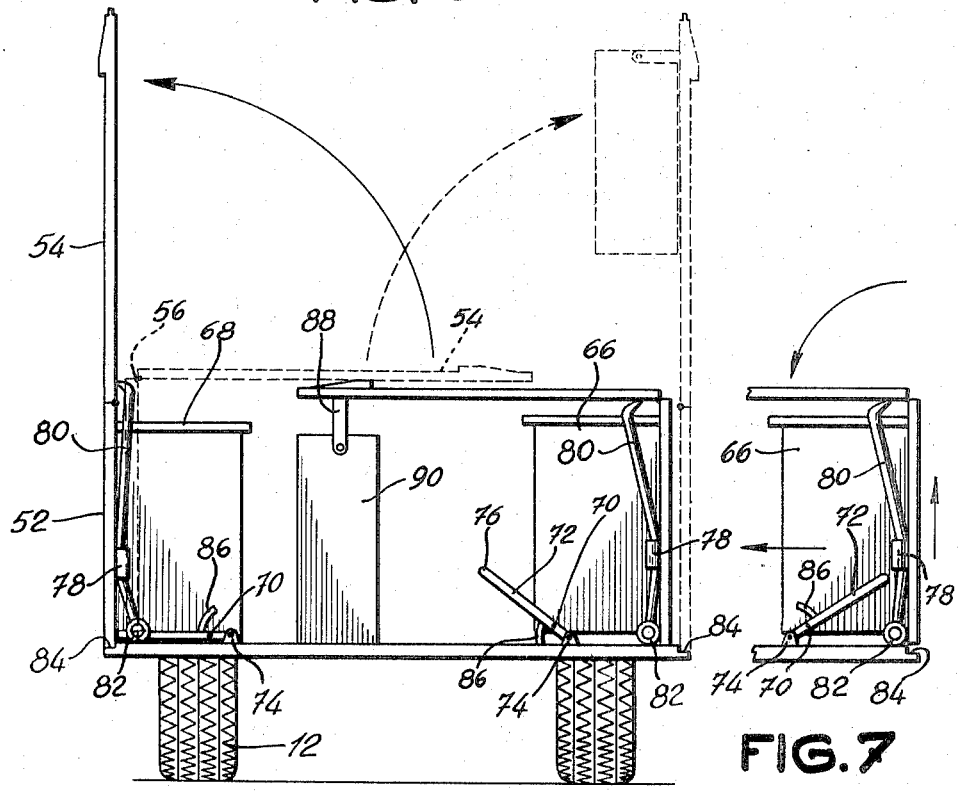
FIG. 7

FOLDING HOUSE TRAILER

The present invention relates to house trailers of the type comprising various sections which can be folded down to provide a compact trailer so as to facilitate maneuverability when in motion and which can be erected to provide a more spacious house structure when using the trailer as a dwelling.

The advantages of having a folded down trailer of reduced dimensions, especially reduced height, are well known. Such trailers allow greater visibility and are not as strongly affected by atmospheric conditions, especially strong winds. These trailers also offer less wind resistance as well as improved clearance especially in wooded areas where a tall trailer may become entangled in low tree branches. This latter characteristic is of great importance especially in view of the fact that trailers of this type are often used for camping purposes. The reduced height also helps to facilitate storage of the trailer in a garage or carport.

The present invention constitutes an improvement over prior art arrangements of this type some of which are difficult to erect and collapse while others only provide a very limited increase of space when in the erected condition.

It is an object of the present invention to overcome these disadvantages while at the same time keeping the weight of the house trailer to a minimum by full utilization of the entire areas of wall structures it provides.

There is provided according to the invention a folding house trailer comprising a
chassis,
a floor mounted on the chassis foldable box-like end sections pivoted on the floor dimensioned to nest one within the other in folded position and defining a space there between in raised position
foldable side walls connected to the floor dimensioned to nest within the inner end section in folded position and to enclose the space laterally in raised position;
and a roof pivoted to one of the end sections dimensioned to cover the space in unfolded position. This arrangement provides great ease of erection since all the parts are permanently connected to each other and there is no need for handling separate panels. All the parts are furthermore simply pivoted and can be raised with relatively little effort. In the erected position no part of the house trailer space is enclosed by duplicate wall portions as is sometimes the case in prior art arrangements, so that the weight is kept to a minimum.

Further according to the invention, the roof is formed of a pair of hinged panels one of which is pivoted to the outer end section and foldable externally thereof. This arrangement enables the roof to be kept open under favorable weather conditions without interfering with the interior of the house trailer space.

Further according to the invention, each foldable side wall comprises a lower panel dimensioned to nest within the inner end section in upright position and an upper panel hinged to the lower panel, whereby a certain space above the floor is not required for containing any collapsable parts and may be used for permanent fixtures.

Further according to the invention, each lower panel is slidably mounted to move between an inward nesting position and an outward position flush with the outer end section so as to provide a continuous sealed enclosure wall.

Still according to the invention, each lower panel has a box-like structure in the interior thereof and a link pivoted to the box-like structure and to the floor so as to positively guide the lower panel between its two aforementioned positions.

Further according to the invention, each lower panel has a lever vertically slidably mounted thereon spaced from the panel at its upper end and dimensioned to engage the floor at one end and the associated upper panel at the other end to provide a fulcrum for raising the lower panel when the upper panel is folded. As a consequence, the lower panel in the erected position is lowered against the floor to provide a positive seal while in the nested position it is raised off the floor to facilitate the sliding movement thereof.

Still according to the invention, each link has a projection on its inward face holding the box-like structure in a raised position when in the nesting position so as to keep the box-like structure in a vertical position.

Further according to the invention, each lever has a wheel at its lower end engaging the floor to further ease the sliding movement of the box-like structure.

Further according to the invention, each link has a handle extension beyond its pivotal connection to the box-like structure to facilitate the handling and movement of the box-like structure.

Still according to the invention, the floor has stepped edges receiving the bottom edges of the lower panels in erected position to improve the seal between the side walls and the floor.

Further according to the invention, the upper panel of one of the side walls has a box hinged thereto, dimensioned to support the panel in horizontal position when the same is folded down. This box may be used for storage and in the erected position of the panel it will hang down against the inner face of the panel due to the hinged arrangement.

A preferred embodiment of the invention is illustrated by way of example in the accompanying drawings in which FIG. 1 is a perspective view of a folding house trailer according to the invention in folded position.

FIGS. 2, 3 and 4 are perspective views of the folding house trailer of FIG. 1 at progressive intermediate positions in the erection thereof.

FIG. 5 is a side elevation of the trailer in fully erected position.

FIG. 6 is an end elevation with one of the end sections removed showing one side wall erected and the other side wall collapsed and in nested position.

FIG. 7 is a fragmentary detail view corresponding to FIG. 6 and showing one side wall in an intermediate position in the collapsing thereof.

FIG. 8 is a cross-sectional view taken along line 8—8 of FIG. 5.

FIG. 9 is a cross-sectional view taken along line 9—9 of FIG. 5.

Referring to the drawings, the folding house trailer illustrated therein comprises a frame 10 mounted on a pair of wheels 12 and comprising a tow bar 14 with a socket 16 for connection to a ball type hitch (not shown). The frame 10 carries thereon a floor panel 18.

The floor 18 has pivotally mounted at the rear end thereof, a box-like end section 20, which in the folded position of FIG. 1, constitutes the outer end section and forms a cover enclosing the entire trailer. End section 20 comprises a main body panel 22, perpendicular side panels 24 and top and bottom panels 26, 28 which are slanted in converging direction towards the main panel 22. The end section 20 is hinged to the floor 18 by means of panels 24 and a portion of the end section extends beyond the end of floor 18 and in the upright position of FIGS. 2 to 5 below the floor 18. The side walls 24 of end section 20 are provided with centrally disposed handles 30 and may carry parking lights or reflectors 32.

The other end section 34 is pivoted by a hinge 36 to floor 18 a short distance inwardly of the front end of floor 18. End section 34 has a main panel 35 which may be provided with a window 38, perpendicular side panels 40, a bottom panel 42 and a sloping roof panel 44 which curves and projects beyond panel 36 and 46 to form an eaves above the window 38 as shown in FIGS. 3 to 5. One of the walls 40 is provided with an access door 48 visible in FIG. 5.

The end section 34 is so dimensioned that in folded position, as shown in FIG. 2, it nests within the end section 20. The dimension of end section 20 is preferably such that in the folding position the end section 20 will accommodate not only the end section 34, but also a pair of folded down cots 50, which in folded position, as shown in FIGS. 2 and 3, lie against the main panel 22 of the end section 20. In upright position as shown in FIGS. 3 and 4, the end section 34 rests with its bottom 42 on the floor 18.

When the end sections 20 and 34 are in raised position as shown in FIG. 3, they define therebetween an open space which as shown in FIGS. 4 and 5, can be enclosed by side walls on each side constituted by a lower relatively narrow side wall panel 52 and an upper relatively wider side wall panel 54 hinged to the lower panel 52 by a hinge 56 visible in FIGS. 3 to 6. The top of the space between end sections 20 and 34 can be enclosed by a roof formed of a panel 58 hinged to the free edge of the roof panel 26 of end section 20 and a second roof panel 60 hinged to roof panel 58. Roof panels 58 and 60 are dimensioned so that in the unfolded position, as shown in FIG. 5, they span the space between end sections 20 and 34 and the outer edge of roof panel 60 reaches the roof panel 44 of end section 34 to provide a continuous roof. In the folded position, as shown in FIGS. 1 to 3, the roof panels 58 and 60 fold over each other and against the roof panel 26 of end section 20 externally thereof.

As shown in FIG. 8, the side wall panel projection 54' is connected to the end side panel 40 by means of a screw provided with wing nut. The dotted lines refer to a folded position as indicated by the arrow A. The projection 54' is hinged to the side wall panel 54.

The upper side wall panel 54 of each side wall is preferably provided with a window 62 topped by an eaves 64.

The lower panel 52 of each side wall has connected to the interior thereof, a box-like structure 66 dimensioned to contain therein the top portion of one of the wheels 12 and kitchen utilities: sink stove 68. The box-like structures 66 are short of the ends of corresponding panels 52 and have their inward bottom corners pivoted at 70 to links 72 which are pivoted to the brackets 74 mounted on the floor 18. The links 72 extend beyond pivots 70 to form handles 76. Panels 52 are provided internally thereof on either side of box-like structures 66 with sleeves 78 in which are longitudinally slidably mounted levers 80 carrying small wheels 82 at their bottom end. The levers 80 are dimensioned and shaped so that their top ends which are spaced from the panels 52, are engaged by upper panels 54 when the same are folded down, as shown in FIG. 6, whereby panels 52 are lifted to a small extent. To erect the side walls, handles 76 are rotated outwardly so that the box-like structure 66 and panel 52 on each side are moved outwardly from the position shown in FIG. 6 to the position shown in FIG. 7, by rolling on wheels 82. The upper panel 54 is then rotated upwardly causing the lower panel 52 to drop into a stepped edge portion 84 of floor 18 thereby insuring a good seal between the side wall and the floor. When panel 54 is collapsed inwardly, when folding down the trailer, it engages the upper end of lever 80 which acts as a fulcrum to again raise the lower panel 52 and allow is to be shifted inwardly. The inward position of the side walls allow them to be nested within the end section 34 in folded position, while the outer position of the side walls is such that when the same are erected they are flush with the walls 24 of the end section 20 so as to provide a continuous closure.

The link 72 has on its inward face a projection 86 which engages the floor 18 in the collapsed position and holds the inner end of the box-like structure 66 in a raised position level with the raised position of the outer structure so as to keep the box-like structure 66 on each side in a vertical position.

The upper panel 54 of one side wall which is designed to be folded down first, comprises near the upper end of the interior face thereof brackets 88 from which is suspended a box 90 which in the folded position, rests on the floor 18 and supports the panel 54 in horizontal position and which in the erected condition of the corresponding panel 54 pivots and hangs under its own weight against the inner face of the panel. The box 90 can be used for storage. The panel 54 of the other side wall in folded condition, rests on the panel 54 which carries the box 90, as shown in FIG. 6.

After erection is completed, the house trailer is leveled and stabilized by inserting jacks 92 under the towbar 14 and under the bottom panel 28 of end section 20. The jack 92 under the end section 20 also has the effects of positively holding the house in erected position.

I claim:

1. A folding house trailer comprising:
    a chassis having a floor mounted thereon;
    a pair of box-like end sections pivoted on the front and rear portions, respectively, of said floor and dimensioned so that one end section nests within the other end section when said sections are pivoted downwardly against said floor and being spaced apart when pivoted upwardly from said floor to erected position;
    side walls on opposite sides of said floor and each comprising a lower upright panel mounted on said floor for limited movement thereover between inner and outer positions and an upper panel hinged to the upper edge of its lower panel for pivotal movement inwardly over said floor but spaced upwardly therefrom, said side walls being dimensioned to close the space between erected end sections when in said outer positions and to nest within said one section when said upper panels are pivoted downwardly and said lower panels moved to said inner positions and said end sections are pivoted downwardly; and a roof pivoted to an edge of said other end section to extend between the upper edges of erected end sections and to fold against the outside of said other end section when said sections are pivoted downwardly.

2. A folding house trailer according to claim 1, wherein each lower panel has a box-like structure inwardly thereof, and a link pivoted to said box-like structure and to the floor.

3. A folding house trailer according to claim 1, wherein said upper panel of one of the side walls has a box hinged thereto dimensioned to support said panel in a horizontal position when the same is folded down.

4. A folding house trailer comprising:
a chassis;
a floor mounted on said chassis;
foldable box-like end sections provided on said floor dimensioned so that one end section nests within the other end section in folded position and defining a space therebetween in raised position;
foldable side walls connected to said floor dimensioned to nest within said one end section in folded position and to enclose said space laterally in raised position;
a roof pivoted to one of said end sections dimensioned to cover said space in unfolded position;
each foldable side wall comprising a lower panel dimensioned to nest within said one end section in upright position and an upper panel hinged to said lower panel, each lower panel being slidably mounted between an inward nesting position and an outward position flush with said other end section, each lower panel having a box-like structure in the interior thereof, and a link pivoted to said box-like structure and to the floor; and
each lower panel having a lever vertically slidably mounted thereon spaced from the panel at its upper end and dimensioned to engage the floor at one end and the associated upper panel at its upper end to provide a fulcrum for raising said lower panel when said upper panel is folded.

5. A folding house trailer according to claim 4, wherein each link has a projection on its inward face holding said box-like structure in a raised position when in the nesting position.

6. A folding house trailer according to claim 4, wherein each lever has a wheel at its lower end engaging the flooor.

7. A folding house trailer according to claim 5, wherein each link has a handle extension beyond its pivotal connection to said box-like structure.

8. A folding house trailer according to claim 5, wherein said floor has stepped edges receiving the bottom edges of said lower panels.

* * * * *